United States Patent [19]
Sato et al.

[11] Patent Number: 5,384,900
[45] Date of Patent: Jan. 24, 1995

[54] METHOD OF MANAGING AN IMAGE MEMORY BY A PROCESS INDEPENDENT OF AN IMAGE PROCESSING PROCESS

[75] Inventors: Hiroaki Sato, Sagamihara; Masatoshi Okutomi; Hiroyuki Yamamoto, both of Yokohama; Hideyuki Tamura, Yamato; Hiroshi Okazaki, Yokohama, all of Japan

[73] Assignee: Canon Kabushiki Kaisha, Tokyo, Japan

[21] Appl. No.: 116,545

[22] Filed: Sep. 7, 1993

Related U.S. Application Data

[63] Continuation of Ser. No. 683,471, Apr. 9, 1991, abandoned, which is a continuation of Ser. No. 322,118, Mar. 13, 1989, abandoned.

[30] Foreign Application Priority Data

| Mar. 14, 1988 | [JP] | Japan | 63-058659 |
| Mar. 14, 1988 | [JP] | Japan | 63-059657 |
| Mar. 14, 1988 | [JP] | Japan | 63-059658 |

[51] Int. Cl.⁶ .......................... G06F 3/00; G06F 12/14
[52] U.S. Cl. ..................... 395/100; 364/DIG. 1; 364/DIG. 2; 364/230; 364/246; 364/246.6; 364/246.8; 364/962; 364/963; 364/966.1; 364/967; 364/967.2; 364/967.4; 364/967.5
[58] Field of Search ............... 364/DIG. 1 MS File, 364/DIG. 2 MS File; 395/100, 800, 200, 250, 275, 400, 425, 600, 650; 358/256, 260

[56] References Cited

U.S. PATENT DOCUMENTS

| 4,454,575 | 6/1984 | Bushaw et al. | 364/200 |
| 4,580,242 | 4/1986 | Suzuki et al. | 364/900 |
| 4,601,003 | 7/1986 | Yoneyama et al. | 364/518 |
| 4,817,050 | 3/1989 | Komatsu et al. | 364/900 |
| 4,833,625 | 5/1989 | Fisher et al. | 364/518 |
| 4,989,137 | 1/1991 | Oxley et al. | 364/DIG. 1 |

Primary Examiner—Robert B. Harrell
Attorney, Agent, or Firm—Fitzpatrick, Cella, Harper & Scinto

[57] ABSTRACT

An image processing apparatus includes an image memory for storing image information, an execution process for processing the image information stored in the image memory. A table is also included, for storing a use condition of the image information stored in the image memory, as well as a management process for managing a memory area of the image memory on the basis of the use condition stored in the table.

7 Claims, 16 Drawing Sheets

| FRAME NO. | OCCUPANT UID |
|---|---|
| 1 | 902 |
| 2 | 778 |
| 3 | 0 |
| 4 | 902 |
| 5 | 0 |
| 6 | 0 |
| 7 | 0 |

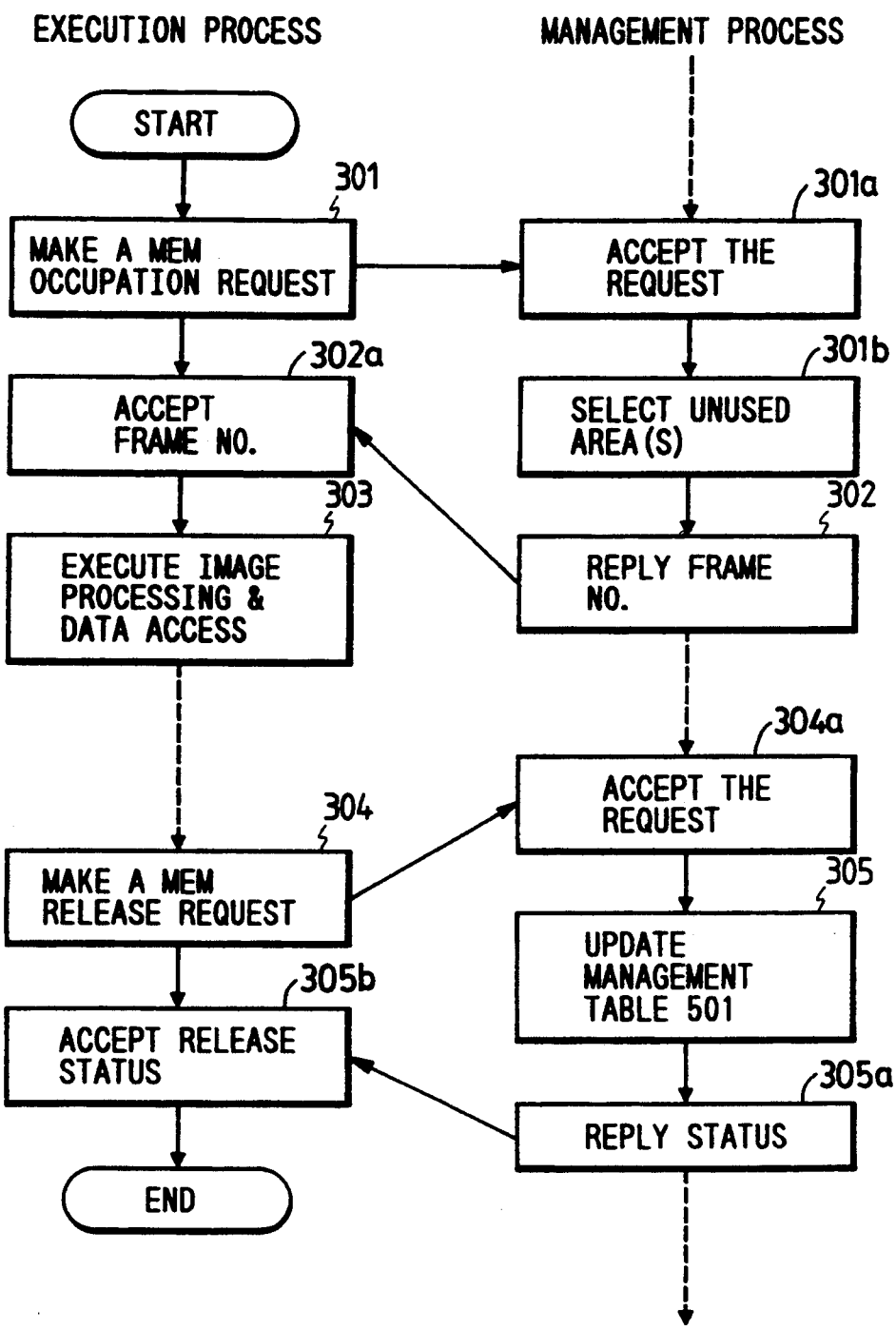

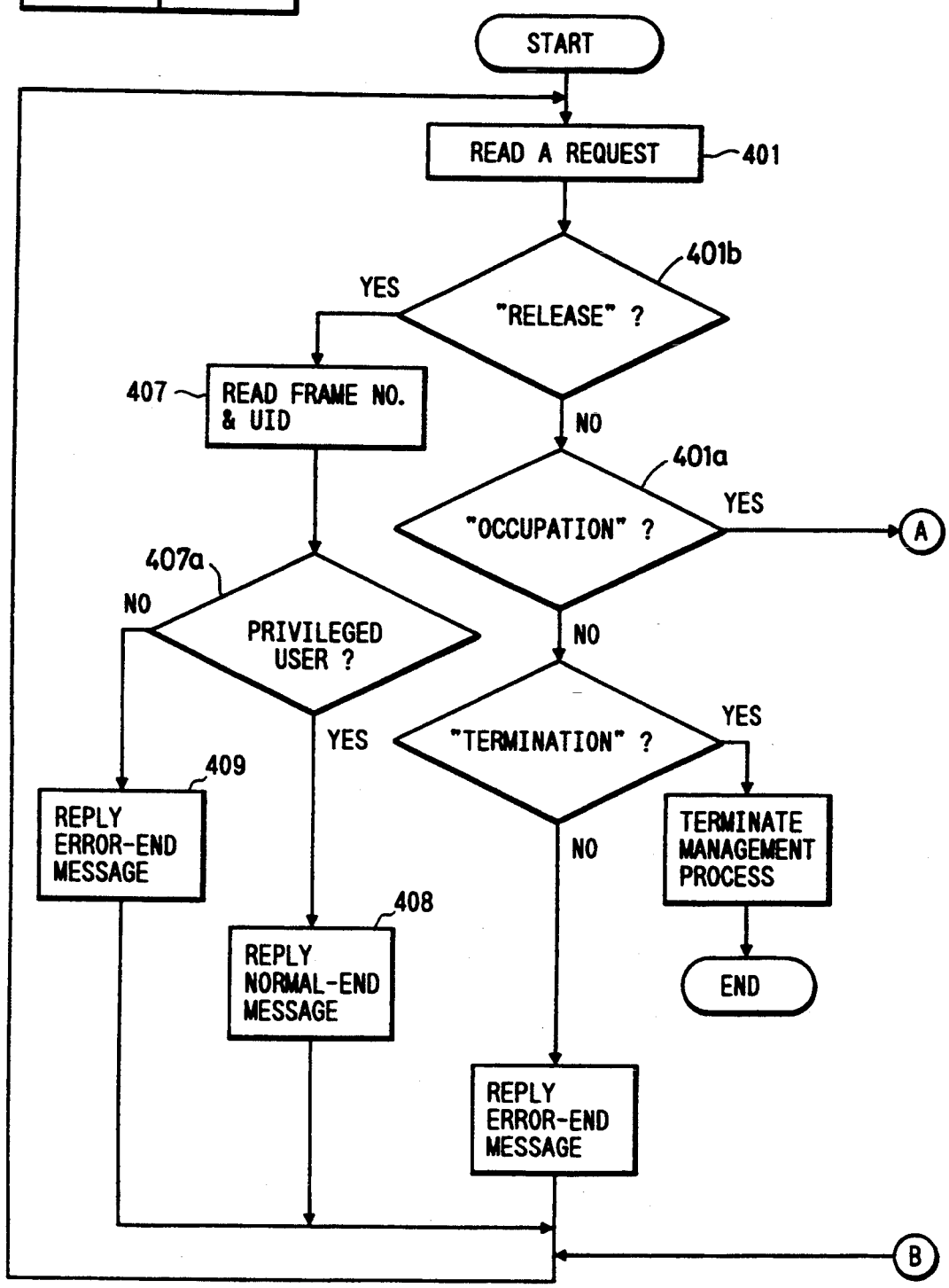

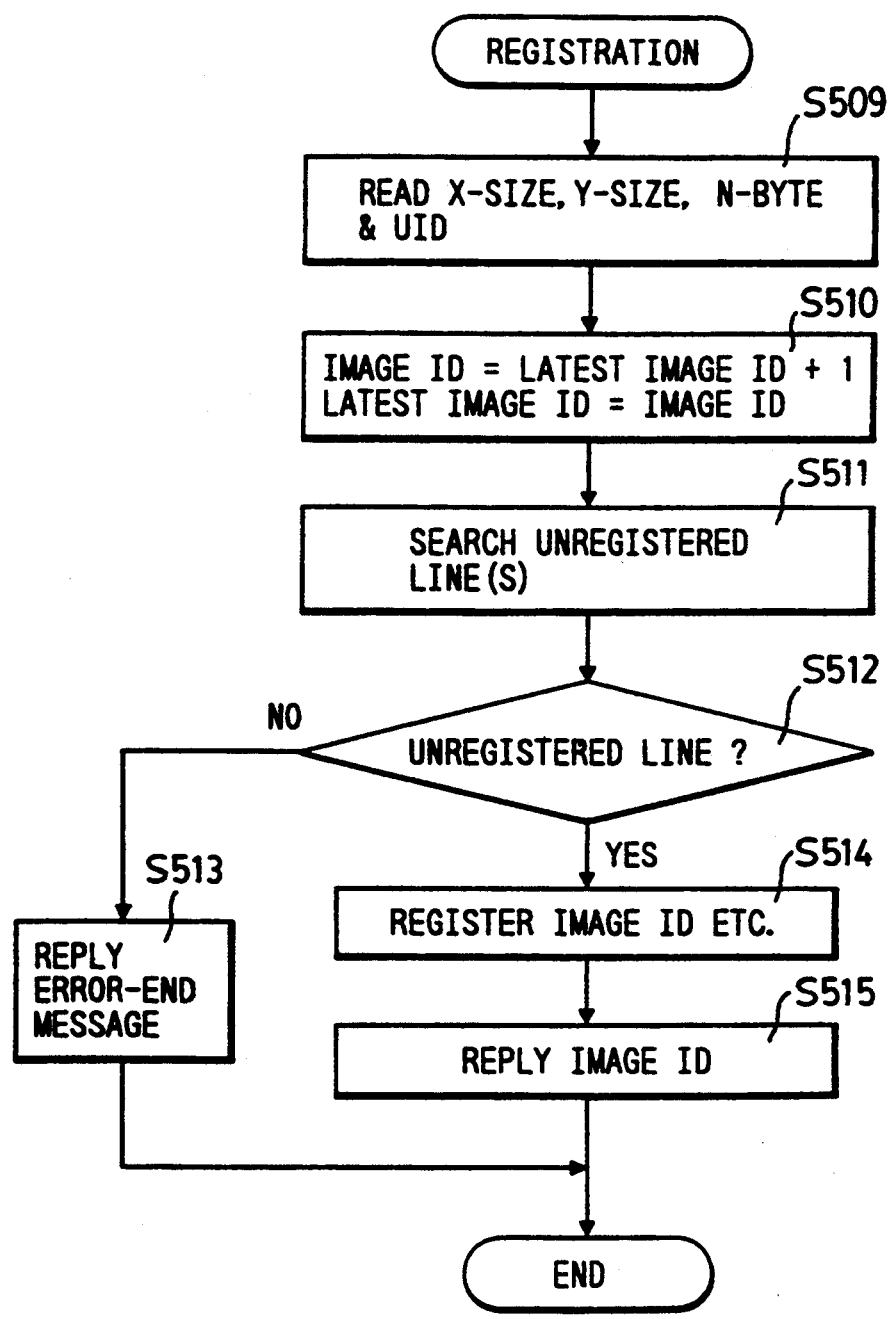

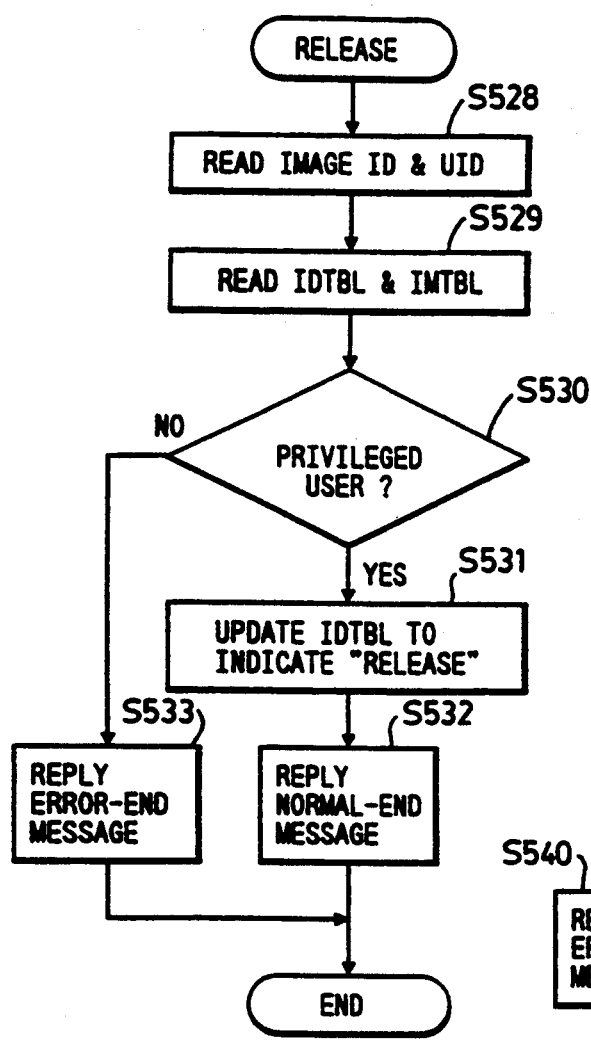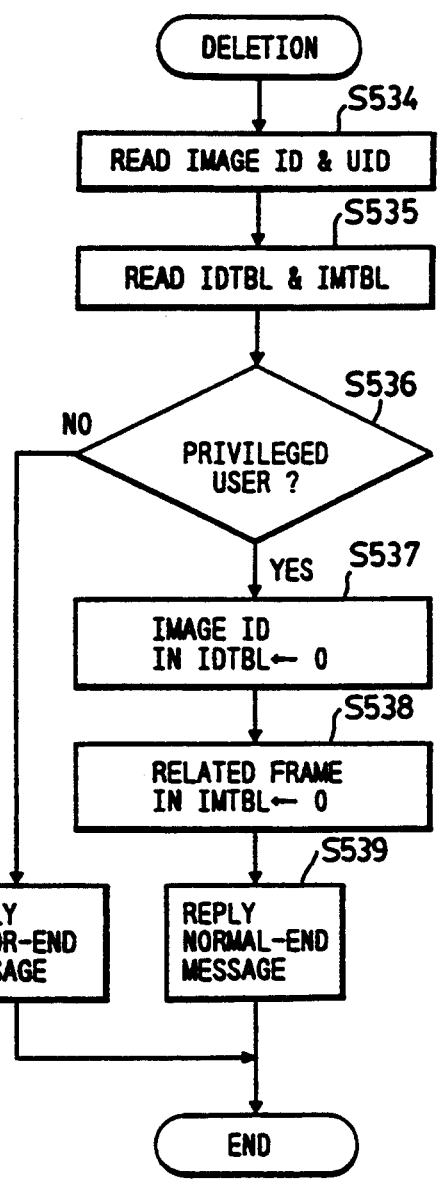

FIG. 9A

| IMAGE ID | X-SIZE | Y-SIZE | N-BYTE | COND. VALUE | FRAME | UID |
|---|---|---|---|---|---|---|
| 10 | 512 | 512 | 1 | 0 | { } | 902 |
| 3 | 256 | 256 | 2 | 1 | {1, 2, 0, ---} | 902 |
| 7 | 128 | 128 | 1 | 3 | {4, 0, ---} | 778 |
| 9 | 128 | 128 | 1 | 0 | { } | 778 |
| 0 | | | | | | |
| 0 | | | | | | |
| 0 | | | | | | |
| ------ | | | | | | |

| FRAME NO. | OCCUPANT UID |
|---|---|
| 1 | 902 |
| 2 | 902 |
| 3 | 0 |
| 4 | 778 |
| 5 | 0 |
| 6 | 0 |
| 7 | 0 |
| ------ | ------ |

| IMAGE ID | X-SIZE | Y-SIZE | DEPTH | STATUS | USER ID | FRAME NO. |
|---|---|---|---|---|---|---|
| 3 | 512 | 512 | 1 | 2 | 31 | 0 |
| 7 | 512 | 512 | 2 | 4 | 31 | 0 |
| 11 | 256 | 256 | 2 | 2 | 40 | 0 |
| 16 | 256 | 256 | 2 | 2 | 40 | 0 |
| 31 | 512 | 512 | 1 | 5 | 31 | 2 |
| 18 | 512 | 512 | 2 | 5 | 31 | 4 , 5 |
| 1 | 512 | 512 | 1 | 1 | 31 | 0 |

FIG. 14

| FRAME NO. | 1 | 2 | 3 | 4 | 5 | 6 |
|---|---|---|---|---|---|---|
| USER ID | 0 | 40 | 0 | 31 | 31 | 0 |

FIG. 15

| COMMAND | USER ID | PAR 1 | · · · · · · · |
|---|---|---|---|

PARAMETERS

METHOD OF MANAGING AN IMAGE MEMORY BY A PROCESS INDEPENDENT OF AN IMAGE PROCESSING PROCESS

This application is a continuation of application Ser. No. 07/683,471 filed Apr. 9, 1991, now abandoned, which is a continuation of application Ser. No. 07/322,118 filed Mar. 13, 1989, now abandoned.

BACKGROUND OF THE INVENTION

1. Field of the Invention

The present invention relates to an image processing apparatus having a management system for an image storage area when image data stored in an image memory is accessed during execution of a program and, more particularly, to an image processing apparatus capable of effectively managing an image storage area.

2. Related Background Art

A conventional image processing system comprises a computer such as a general-purpose microcomputer and image processing hardware (e.g., an image memory and an image processor are circuit components of the image processing hardware). High-speed processing can be performed by image processing hardware functions. In recent years, the following hardware has become commercially available. A function for directly allocating an external bus area to a virtual memory area is added to an engineering work station (EWS), and an image memory can be directly accessed by address data on an external address bus of the EWS. High-speed operations and software flexibility have been requested in image processing systems, and the above system eliminates data transfer between the main memory and the image memory or allows high-speed data transfer between them. Therefore, an application program which satisfies both requirements of high-speed processing and flexibility can be obtained. Examples of this system are an EWS Sun3/260C available from Sun Micro Corp. and a combination of image processing hardware NEXUS6810 (available from NEXUS Corp.) and VME expansion boards.

FIG. 1—1 shows such a system configuration. This system mainly comprises an EWS 101 serving as a host station and an image processing apparatus 102 joined by a system bus 107. The EWS 101 includes a CPU 103 and a main memory 106. The image processing apparatus 102 includes an image memory 104 and an image processor 105 joined by an exclusive bus 108. The above-mentioned computer equipment is used to arrange this system. Image data in the image memory 104 can be processed by either the image processor 105 or the CPU 103.

[I] A program including processing using the image processor and software processing by the CPU in the EWS in the image processing system has the following structure.

A series of image processing is performed such that (i) a given original image is subjected to edge emphasis, (ii) the edge-emphasized image is subjected to noise elimination (smoothing), and (iii) the smoothed image is finally subjected to dither processing. In this case, operations (i) and (ii) are performed by the image processor, while operation (iii) is performed by the CPU. This program is used in the following operations. That is, an original image is input to, e.g., a first frame of an image memory, operation (i) is performed for the image of the first frame, and the processing result is stored in a second frame. Operation (ii) is performed for the image of the second frame, and the processing result is stored in a third frame. After a state is obtained in which the third frame and a fourth frames can be directly accessed by the CPU in correspondence with a virtual memory area, operation (iii) is performed by utilizing the virtual memory addresses of the virtual memory area, and the processing result is stored in the fourth frame. Physical data storage areas such as the first, second, third, and fourth frames are required in the program because the memory management mechanism of an EWS operating system (OS) cannot be applied to an external memory such as an image memory. In a program of this type, a programmer must manage a correspondence between frames of the image memory and corresponding image data, and a correspondence between the processing result and the corresponding storage locations. This allocation can be decided at the time of programming. Therefore, only the permanent program which defines fixed frames is available.

The above program includes the following disadvantages:

A. It is difficult to utilize image data areas such as processing results of other programs (processes) and set the areas without erasing the processing results; and B. The program must be significantly corrected whenever an image memory is added or the hardware configuration is changed.

The above program must be written under the condition that another image has previously been input to the first frame and should not be lost. In addition, when processing is complicated, the correspondence between the frames and the image data overloads the programmer.

[II] When programming is made to perform the following operations: (i) a given original image is subjected to edge emphasis, (ii) the edge-emphasized image is subjected to noise elimination (smoothing), and (iii) the smoothed image is finally subjected to dither processing. Operations (i) and (ii) are performed by the image processor, while operation (iii) is performed by the CPU. In the image processing system, processing by the image processor and processing by the CPU in the EWS are utilized in a mixed manner.

Assume an image having X pixels in the horizontal direction and Y pixels in the vertical direction is to be dealt with. A commercially available processing apparatus as described above has a two-dimensional address space fixed by hardware to represent frames each serving as a processing unit of the processor. The image data must be stored as a matrix in the address space. Therefore, when the image processor is used, the image data must be located in a location format (to be referred to as a "fixed location" method) as shown in FIG. 1-2(a). FIG. 1-2(b) is a memory map when the location of FIG. 1-2(a) is viewed from the CPU in the EWS. When processing is performed by the CPU in the EWS, the image data is located in a continuous area (to be referred to as a "continuous location" method hereinafter) in formats of X*Y (pixels) such as

DIMENSION IMAGE
(512, 512)

in programming language FORTRAN and
int image[512][512]
in programming language C.

These formats are represented by an address format and a memory map in units of frames, as indicated by FIGS. 1-2(c) and 1-2(d).

In order to utilize the processing by the image processor and processing by the CPU in the EWS in a mixed manner since the location methods in the image data memory are different, (1) location conversion must be performed if the location method of the image data immediately before an application of a processing module is different from that of the processing module, or (2) the processing module by the CPU in the EWS is entirely reprogrammed to process the image data of the fixed location method.

In either technique, the following disadvantages are presented.

A. In technique (1), since a location conversion program must be generated and utilized in accordance with the content of the processing module and the condition of the image data, programming is overloaded.

B. In technique (2), cumbersome, time-consuming programming operations are required since many existing programs are reprogrammed.

C. Since hardware configuration information is included in the module, many correction operations are required for changing the hardware configuration.

[III] In the above imaging processing system, processing by the image processor is suitable for processing the image data in the image memory, while processing by the CPU in the computer is suitable for processing the image data in the main memory. Therefore, when a program including processing by the image processor and processing by the CPU in the computer is prepared, the image data must be allocated to the main memory in the computer and the image memory in the image processing apparatus while processing progresses. Alternatively, the image data must be transferred between the main memory and the image memory in the image processing apparatus.

The above program has the following disadvantages.

A. It is difficult to input and utilize the image data of processing results of other programs (processes) without going through a secondary memory or set the areas without erasing the image data.

B. The correspondence between the image memory in the main memory in the computer and the image data in the image memory in the image processing apparatus must be set in the program itself. Therefore, the image memory areas of other processes may be destroyed during execution of this program.

C. Many program correction operations are required when an image memory is added or the hardware configuration is changed.

The programmer is overloaded by these disadvantages, and compatibility of the image processing program is impaired mainly by these disadvantages. In addition, transfer of the image data between the common memory and the image memory must be written in to the program.

SUMMARY OF THE INVENTION

The present invention has been made in consideration of the above situation, and has as its object to eliminate the conventional drawbacks described above.

It is another object of the present invention to provide an image memory area management system in an image processing apparatus for storing an area for allocating an unused frame during for program execution and managing the allocation.

It is still another object of the present invention to provide an image memory area management system in an image processing apparatus wherein a hardware dependent portion is processed without using a program (process) so as to cope easily with a change in hardware configuration.

It is still another object of the present invention to provide an image memory area management system in an image processing apparatus wherein a process for independently managing the image memory area as a whole is arranged to perform automatic memory area allocation control and automatic access control without being controlled by a programmer.

It is still another object of the present invention to greatly improve reutilization and modularity of the program by greatly reducing a the load included in programming.

It is still another object of the present invention to provide an image processing apparatus in which a process for independently managing the image memory area as a whole is arranged, includes a means for storing attribute information such as an image data size, and performs location conversion of the image data in response to a request from an image processing execution process, thereby easily performing appropriate location conversion of the image data.

It is still another object of the present invention to provide an image processing apparatus in which a programmer need not consider the utilization condition of the image data and the image memory, and at the same time, the hardware dependent portion is processed without using the program (process), thereby greatly reducing the load involved in programming and greatly improving reutilization efficiency and modularity of the program.

It is still another object of the present invention to provide an image memory area management system in an image processing apparatus wherein A. the image data in the computer is allocated to a common memory used by a plurality of processes, and B. a management process is arranged to independently, systematically manage allocation of the common memory in the computer and the image memory in the image processing apparatus.

It is still another object of the present invention to provide an image memory area management system in an image processing apparatus in which an image memory area management process independent of the image process transfers the image data.

BRIEF DESCRIPTION OF THE DRAWINGS

FIGS. 1-2(a), 1-2(b), 1-2(c) and 1-2(d) are views showing locations of the image data in the image memory;

FIG. 2 is a view showing a process arrangement in an image processing system according to an embodiment of the present invention;

FIG. 3 shows a schematic relationship between an execution process and a management process;

FIG. 5 is a management table used by the management process;

FIGS. 8A, 8B, 8C, 8D and 8E are flow charts showing operations of the management process;

FIGS. 9A and 9B are management tables used by the management process;

FIGS. 12-1 and 12-2 are flow charts showing internal operations in a management process;

FIG. 13 is an image identification (ID) table;

FIG. 14 is an image memory management table; and

FIG. 15 is a format showing an interprocess communication protocol.

DETAILED DESCRIPTION OF THE PREFERRED EMBODIMENTS

The preferred embodiments of the present invention will be described in detail below. The present invention is applied to an image processing apparatus, an image processing system, and a system for managing an image memory included in the image processing apparatus or system.

First Embodiment

Figure 1A:
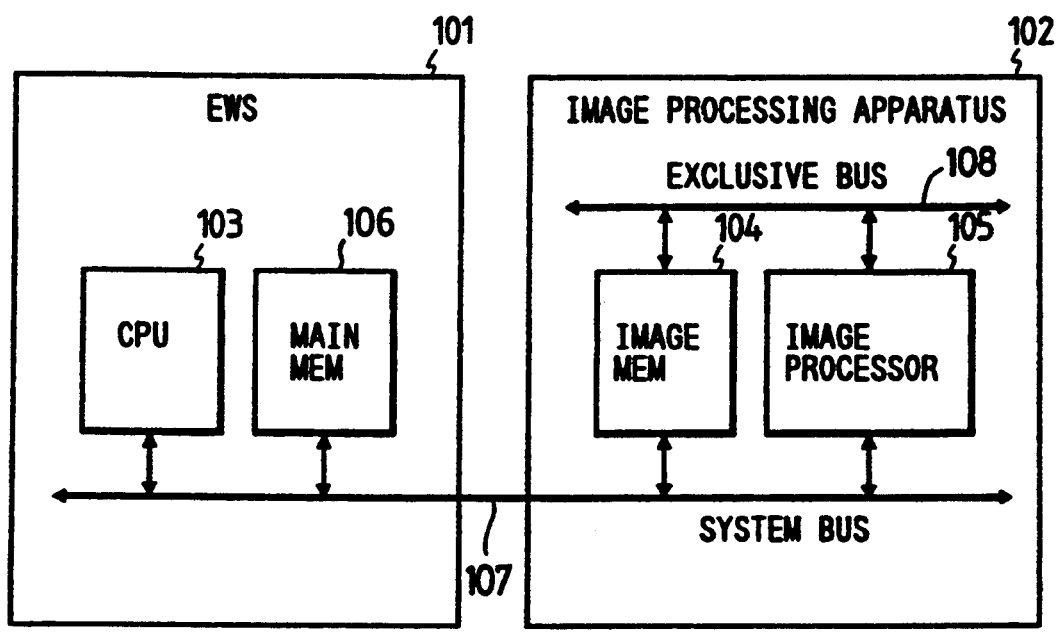
FIG. 1—1 is a block diagram showing an image processing system.
Figure 1B:
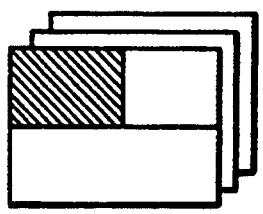
Figure 1C:
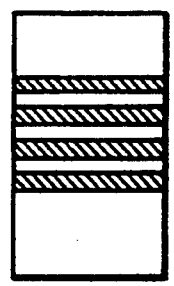
Figure 1D:
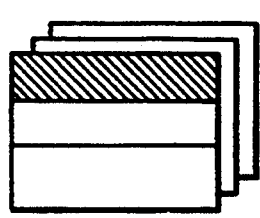
Figure 1E:
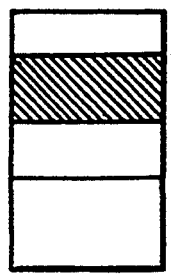
Figures 2, 5:
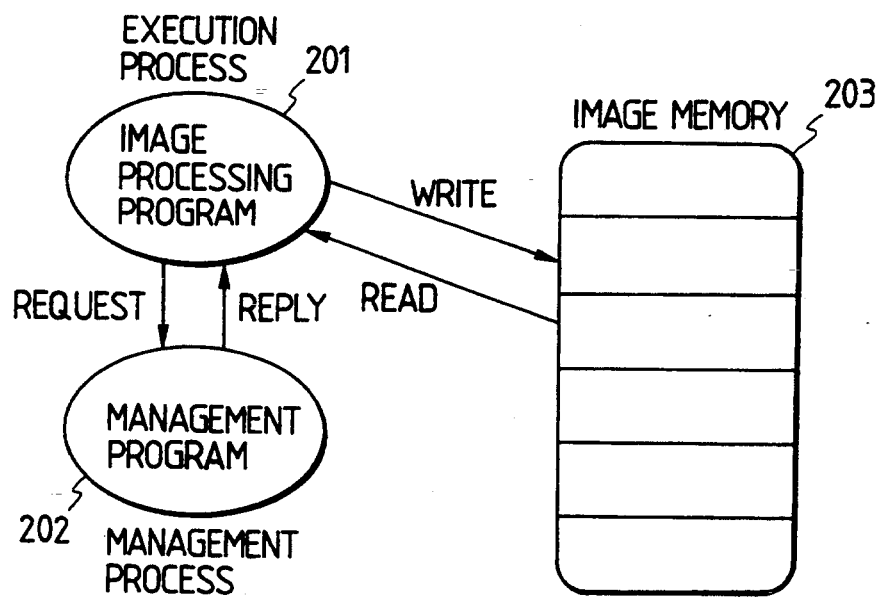

FIG. 2 is a block diagram showing a first embodiment according to the present invention. This arrangement includes an execution process 201 for executing an actual image processing program and a management process 202 for managing an image memory. The overall operation of the arrangement will be generally described.

The execution process 201 sends an area occupation or release request to the management process 202 by using interprocess communication when an image memory area is necessary or unnecessary. The management process 202 searches out an appropriate unused area in the image memory by using an internal management table 501 (to be described in detail later) if an occupation request is sent (i.e., in accordance with the type of request received by the management process 202). The management process 202 sends back information which designates this unused area to the execution process 201. If an area release request is received by the management process 202, the internal management table is updated to reuse the released area.

The information format used in this case may be any format which can be utilized to designate image data for the image processor and which can be converted into a virtual memory address when the CPU accesses this information. In this embodiment, the information format is a number of a frame (to be referred to as a frame number hereinafter) serving as an image memory area unit when the image processor performs processing.

The execution process 201 causes the image processor or the CPU to execute processing on the basis of area information (i.e., the frame number) from the management process 202.

FIG. 3 shows general operations of the execution and management processes 201 and 202 and communication therebetween during execution of actual image processing. The management process 202 is initialized once at the time of system initialization and is powered off at the time of system power-off. Therefore, assume the management process 202 has already been initialized in the past (not shown). The execution process 201 is initialized when a command is input to, e.g., a command interpreter of an OS.

When an area in the image memory is required during program execution, the execution process 201 generates a memory occupation request of the image data area (301). The management process 202 receives this request and searches for an unused image memory area which satisfies a necessary image area in the management table 501. Subsequently, the management table is updated so as not to use the found unused area for other data, and the management process 202 sends back (or replies) the corresponding frame number to the execution process 201 (302).

When the image processor is utilized, the execution process 201, having accepted the frame number (302a), sends a processing command, a frame number subjected to processing, and processing parameters to the image processor to start actual processing (303). However, if a processing result to be received by the CPU is available, the execution process 201 receives it (303). This data transfer is actually performed such that the CPU read-/write-accesses an internal memory and registers in the image processor through a general-purpose bus. When the CPU directly accesses the image data and executes processing, the execution process 201 calculates a start address (real address) of an unused area from a base address serving as a start address (real address) of the image memory 104, the size of the image memory frame, and the frame number to occupy a virtual memory area having a size corresponding to that of the area to be used. This unused area is allocated in the virtual memory area by using the start address (real address) of the unused area of the image memory and the size of the unused area. Read/write access is performed by the CPU by using the addresses (virtual memory addresses) of the virtual memory area.

The execution process 201 releases the related virtual memory area when the image data becomes unnecessary. The execution process 201 sends a memory release request of the area having the frame number corresponding to the unnecessary image data to the management process 202 (304). The management process 202 accepts the request (304a) and updates the management table 501 and sets the area of this frame number in an unused condition (305), and notifies the execution process of the reply status (305a). The execution process then accepts the release status (305b).

If the EWS is a Sun 3/260C and the OS is a Sun OS, the interprocess communication function can be performed by a system call such as a socket. Allocation to the virtual memory area is realized by a system call valloc (i.e., a function of occupation of the virtual memory area), a system call mmap (i.e., a function of allocation to the real address in the virtual memory area), and a system call free (e.g., release of the virtual memory area).

Figure 4B:
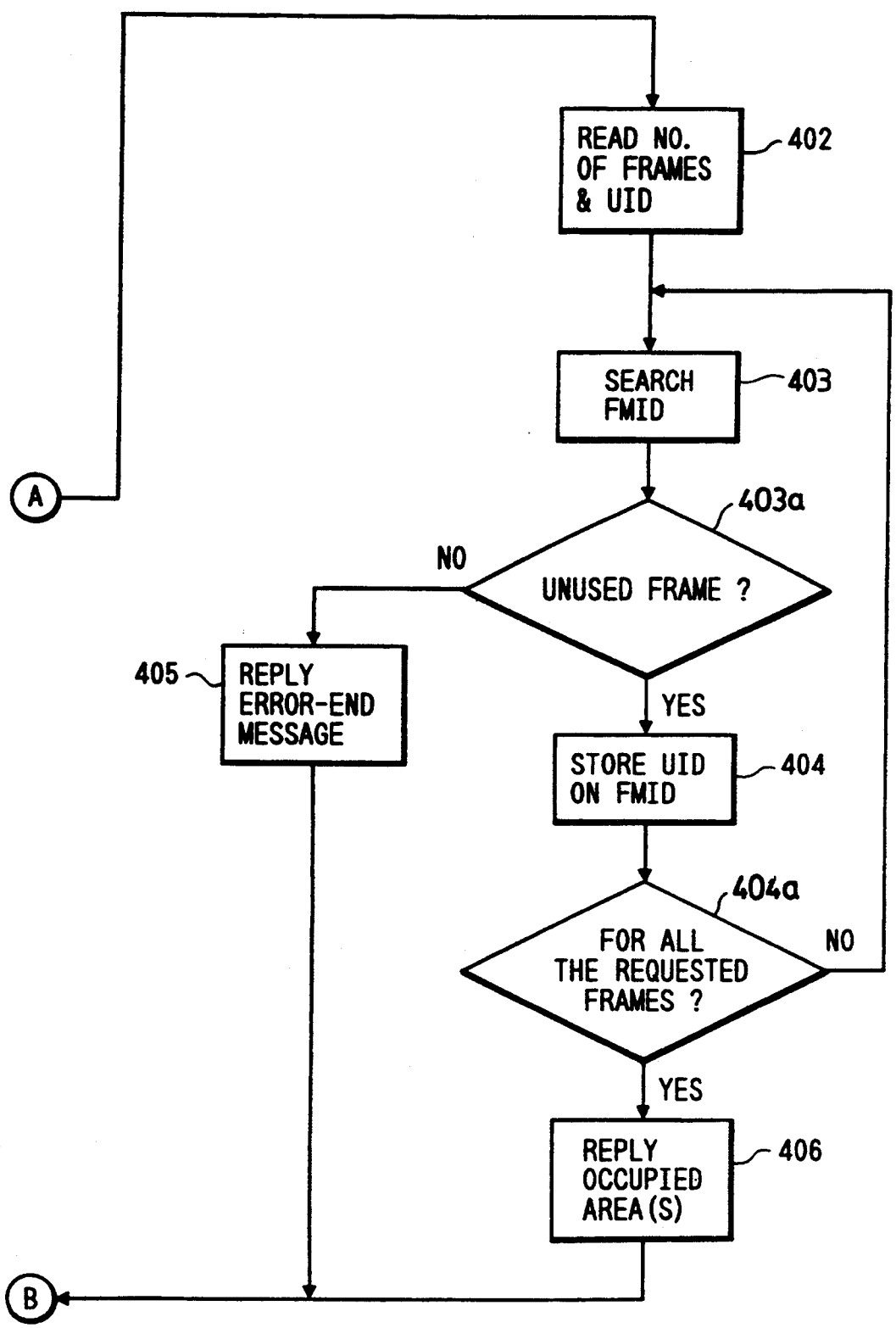
FIG. 4, consisting of FIGS. 4A and 4B, is a flow chart showing an operation of the management process.

FIG. 4 is a flow chart showing an internal operation flow of the management process 202. FIG. 5 shows the management table used by the management process 202. Each line corresponds to one frame information in the image memory. If the frame is not being used, information "0" is stored. However, if the frame is being used, a user identifier (to be referred to as a uid hereinafter) corresponding to the image area is stored as information for each image data.

The operations of the management process will be described with reference to FIGS. 4 and 5.

The management process 202 reads out a request message sent through interprocess communication (401). The management process 202 selects a request processor in accordance with the type of request affixed to the beginning of the message so that control is shifted from the management process 202 to the selected request processor. When execution of the selected request processor is completed, the flow returns to the reading of the request message (401). These operations are repeated until a termination request is sent.

If the type of request represents "occupation", the remaining data of the message are received as the number of frames used in the respective request processors and the data uid of the user who sends the message (402). The management process 202 finds a line number fmid (i.e., the unused frame number) having a value of "0" upon sequential access of the values of the respective lines of the management table (403). The value of this line is updated to the data uid (404) after a check to be certain the frame is unused (403a), and the corresponding frame number is registered in an updated value array (404). When this operation is repeated to obtain frames, the number of which corresponds to the requested number of frames ("yes" in 404a), the content of the updated value array is sent to the user represented by the data uid (406), and the processing is ended. If no zero value is found (i.e., no unused area is available), an error code (−1) (a negative value represents an error) is stored in the updated value array (405), and the resultant data is sent to the execution process 201, thereby ending the processing. The updated value array used in the above case has a size corresponding to the number of frames in the image memory and is exemplified by:
{1,3,0,0,0,0,0,0,0,0,0,0,0,0,0,0}
In the above array, "0" represents no designation.

If the type of request represents "release" (401b), the remaining portion of the message is received as the array of the frame numbers having the same format as that sent during occupation and as the user's uid (407). It is then determined whether a storage value of the line corresponding to the frame number of the management table coincides with the data uid. If the data uid represents a previously set number of a privileged user (407a), the value of this line is reset to zero, which represents nonused status. In this case, a normal-end message is sent in reply to the execution process (408). When the storage value of the corresponding line in the management table is zero (i.e., no image is stored) or represents another data uid (i.e., an area occupied by another user), the value is not updated, and an error-end message is replied (409).

Modifications of First Embodiment

In the above embodiment, information representing an area in the image memory is given by a frame number. However, if addressing of the image processor is performed by real addresses of the image memory, the real addresses can be used as area designation information, thereby omitting an operation for calculating a real address from the frame number. In this embodiment, one image is stored in one frame. However, when image processing hardware capable of utilizing divided image frames is used, information representing which partial areas are occupied may be stored in the management table, thereby storing a larger number of images in the image memory.

As described above, the management process is arranged independently of the execution process for executing the actual image processing. Therefore, an appropriate area can be dynamically assigned as an area to be used in accordance with utilization conditions of the image memory. Therefore, the program can be utilized without causing destruction to processing results of other programs. When a frame of the image memory is added and the total number of frames is increased, only the management process need be modified to achieve appropriate allocation using all the frames. Therefore, all image processing programs can effectively utilize an increased part of the image memory without modifications in the system utilizing the present invention.

Second Embodiment

Figure 6:
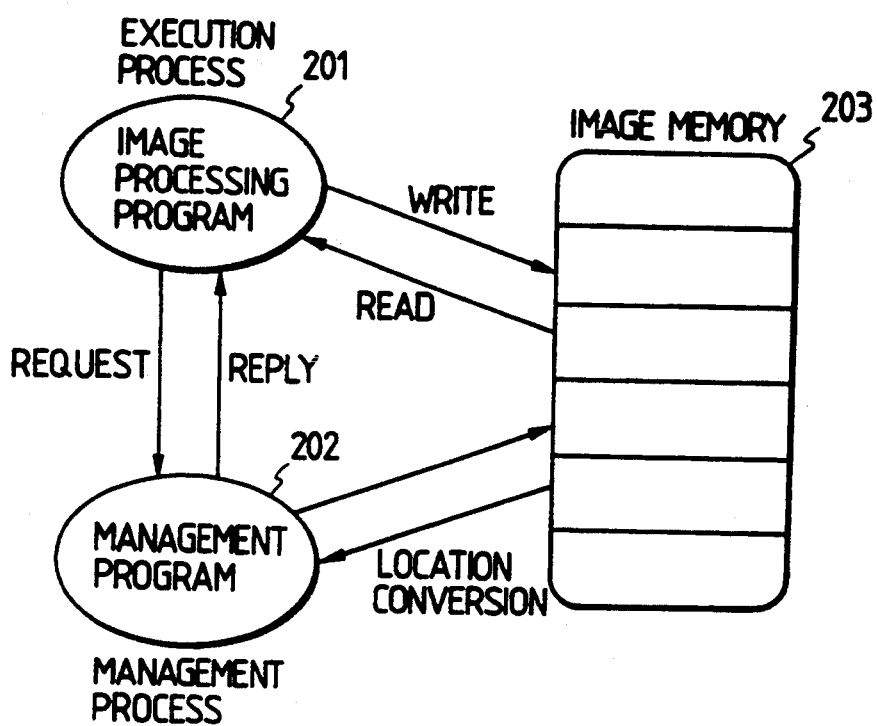
FIG. 6 is a view showing a process arrangement in an image processing system according to another embodiment of the present invention.

FIG. 6 is a block diagram showing a second embodiment of the present invention. This arrangement includes an execution process 201 for executing a program for actually performing image processing and a management process 202 for managing an image memory 203. The overall operation of the arrangement will be generally described below.

The execution process 201 sends "registration", "occupation-continuous location" "occupation-fixed location", "release", and "deletion" requests to the management process 202 through interprocess communication when an image memory area is necessary or unnecessary.

The management process 202 performs appropriate allocation of unused areas and updating of the management table by the use condition with reference to an internal image data management table and a memory area management table (to be described in detail later) in accordance with the types of received requests. Subsequently, the management process 202 replies with information designating the allocated area to the execution process 201. In reply to the occupation request "occupation-continuous location" or "occupation-fixed location" the management process 202 performs location conversion at the time of occupation of the image data when the location method (i.e., the continuous or fixed location method) stored in the image data management table at the time of request reception is different from the requested location method.

The format of information transferred to the execution process during occupation may be a format which can be utilized to designate image data for the image processor and which can be converted into a virtual memory address when a memory access is performed by the CPU. In this embodiment, a number of a frame (to be referred to as a frame number) serving as an image memory area unit during execution of processing by the image processor is used.

The execution process 201 causes the image processor or the CPU to execute processing on the basis of the area information (i.e., a frame number) supplied from the management process 202.

Figure 7:
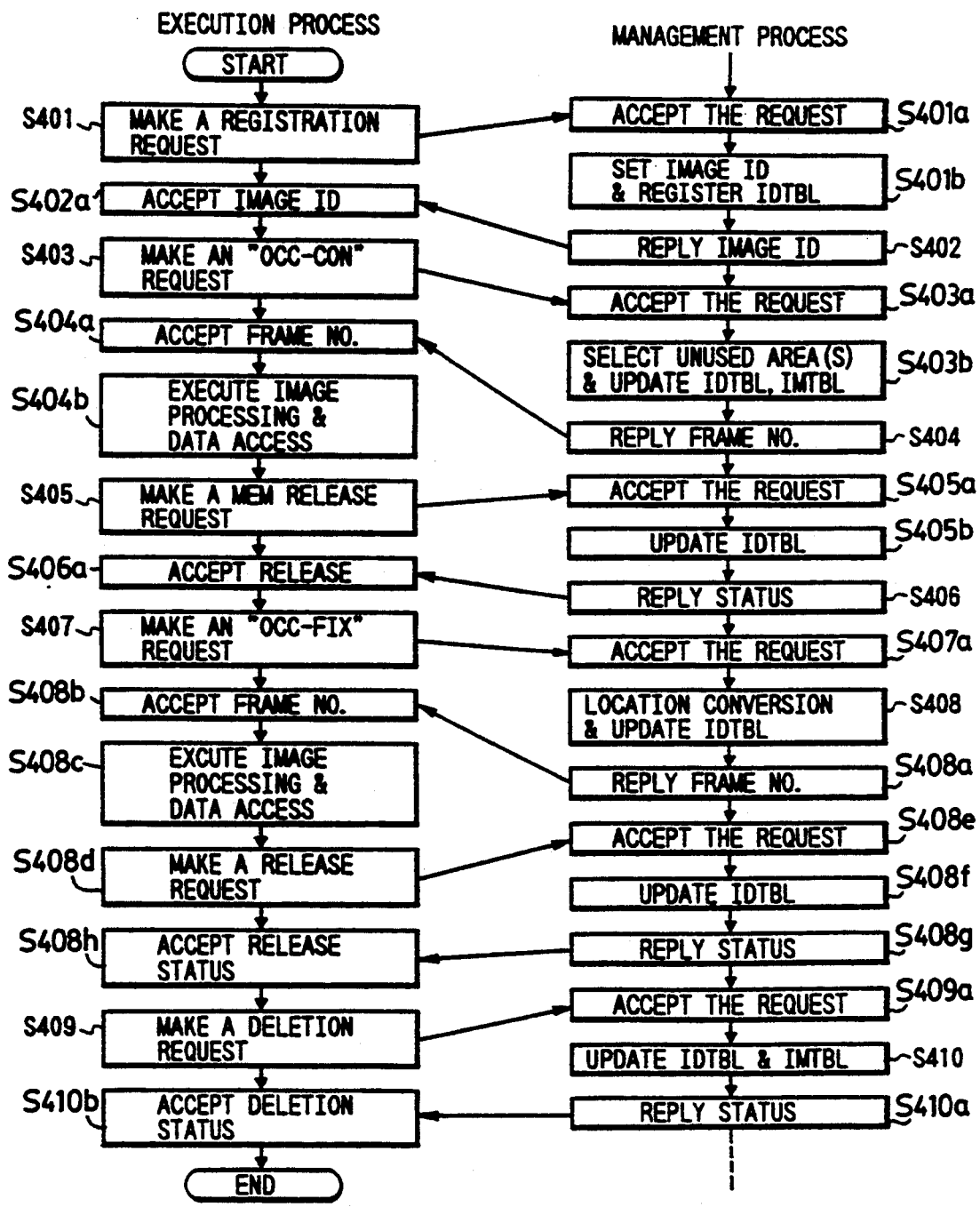
FIG. 7 shows a schematic relationship between an execution process and a management process.

FIG. 7 shows operations of the execution and management processes 201 and 202 and communication therebetween during actual execution of image processing. The management process 202 is initialized once at the time of system initialization. Assume that the management process 202 has already been initialized (not shown). The execution process 201 is initialized whenever a command is input to, e.g., a command interpreter of the OS. The first word of the request message transferred from the execution process 201 to the management process 202 is a number representing the type of request, and a message portion from the second word consists of additional information of words determined by the type of request.

After initialization, the execution process 201 makes a "registration" request of image data (S401). The management process 202 accepts it (S401a) and assigns a new identification number (to be referred to as an image id hereinafter) to the image data. The management process 202 writes the image id, a horizontal size (to be referred to as an x-size hereinafter) of the image data, a vertical size (to be referred to as a y-size hereinafter), and a data volume (to be referred to as an nbyte hereinafter) per pixel in the image data management table. The management process 202 replies by sending the image id to the execution process 201 (S402), which accepts it (S402a).

When the program progresses, when a read/write access of the image data is required, the execution process 201 makes an occupation request (i.e., "occupation-continuous location" or "occupation-fixed location") of the image data area (S403). In response to this, the management process 202 accepts the request (S403a) executes occupation of the image data area (S403b).

When the image data is input for the first time or the area is occupied to store a processing result of the next processing, the management process 202 refers to a condition value in the image data management table to determine whether this image is accessed for the first time, thereby searching for an unused image memory area which satisfies the necessary image area. Subsequently, the location method of the image data designated by the occupation request is written in the image data management table, and the memory area management table is updated not to reuse the searched unused area. The management process 202 replies with the frame number of the searched unused area to the execution process 201 (S404), which accepts the frame number (S404a).

When processing is executed by using the image processor, the execution process 201 sends a processing command, the frame number subjected to processing, and processing parameters to the image processor and causes the image processor to execute actual processing (S404b). When a processing result to be received by the CPU is present, the execution process 201 receives this processing result. This data transfer operation is performed when the CPU performs a read/write access of an internal memory and registers of the image processor through a general-purpose bus.

When the CPU directly accesses the image data and performs processing, a start address (real address) of an area to be used is calculated by a base address serving as a previously set start address (real address) of the image memory, a size of the frame of the image memory, and the frame number, thereby occupying a virtual memory area having a size corresponding to the area to be used. The image memory area to be used is allocated to the virtual memory area by using the start address (real address) of the image memory area to be used and its size (this operation is called mapping to the virtual memory area hereinafter). The CPU refers to and writes image data by using the addresses (virtual memory addresses) of the virtual memory area obtained by mapping.

When a series of access operations in units of modules are completed, the execution process 201 releases the image data area. When an access is performed by the CPU, the virtual memory area used is released. However, when the virtual memory area is used by the image processor, it is not released. The execution process 201 makes a "release" request of the image data area to the management process 202 (S405). The "release" request represents that access to the image data is temporarily unnecessary. Therefore, another occupation request for this image can be accepted. The image data itself is not lost. In practice, the management process 202 accepts the request (S405a), updates the condition value of the image data management table in response to the "release" request and replies (S405b) by sending the normal-/error-end condition value to the execution process 201 (S406), which accepts the release (S406a).

When the operations of the execution process 201 progress, even if an image data access is requested again, the execution process 201 makes an occupation request (S407). The management process 202 accepts the occupation request (S407a), and reads out the condition value of the image data management table, detects the presence of image data, and obtains information representing the type of location method. When image data is already present, the management process 202 does not perform new allocation of the unused area and processes only a difference in location method. When the type of location method represented by the occupation request is different from that detected at this moment, the management process 202 performs location conversion to convert the image data to be defined by the requested location method (S408). Subsequently, the frame number corresponding to the memory area for storing the image data is replied to (S408a) and accepted by (S408b) the execution process.

The execution process 201 processes the image data by the same image data access method as described above (S408c). When a series of access operations are completed, the execution process 201 makes a "release" request (S408d) which is accepted by the management process (S408e). The latter process updates the IDTBL (S408f) and notifies the execution process of the status (S408g), which is accepted (S408h).

Thereafter, when the image data becomes unnecessary, the execution process 201 makes a "deletion" request of the image data to the management process 202 (S409). The management process 202 accepts the request (S409a), initializes the image data of this line and updates the memory management area table, thereby setting the area of the related frame number to be a nonused area (S410). The status is sent to the execution process (S410a), which accepts it (S410b). If the EWS is a Sun 3/260C and the OS is a Sun OS, the interprocess communication function can be performed by a system call such as a socket. Allocation to the virtual memory area is realized by a system call valloc (i.e., a function of occupation of the virtual memory area), a system call mmap (i.e., a function of allocation to the real address in the virtual memory area), and a system call free (e.g., release of the virtual memory area).

Figure 8A:
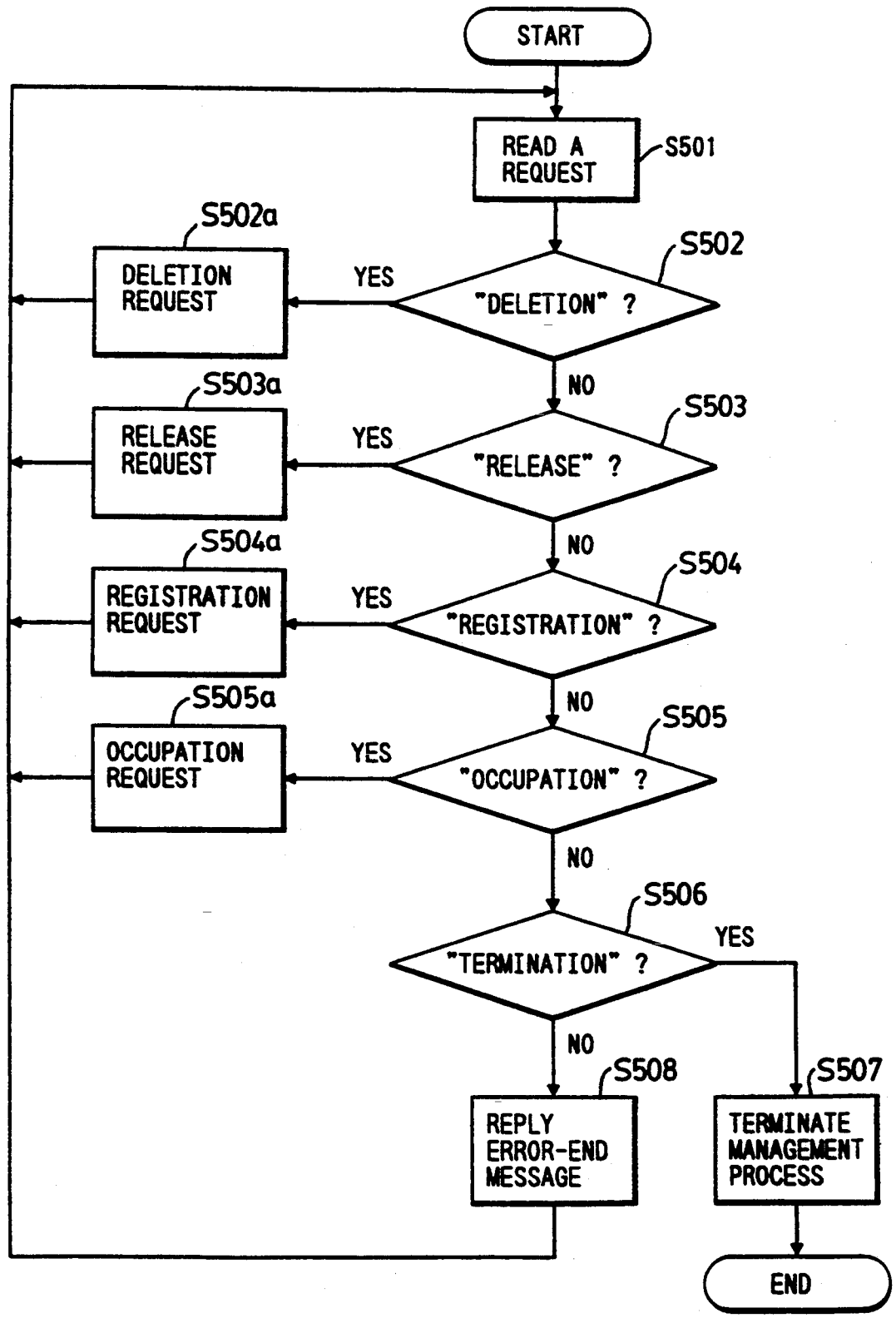
Figure 8C:
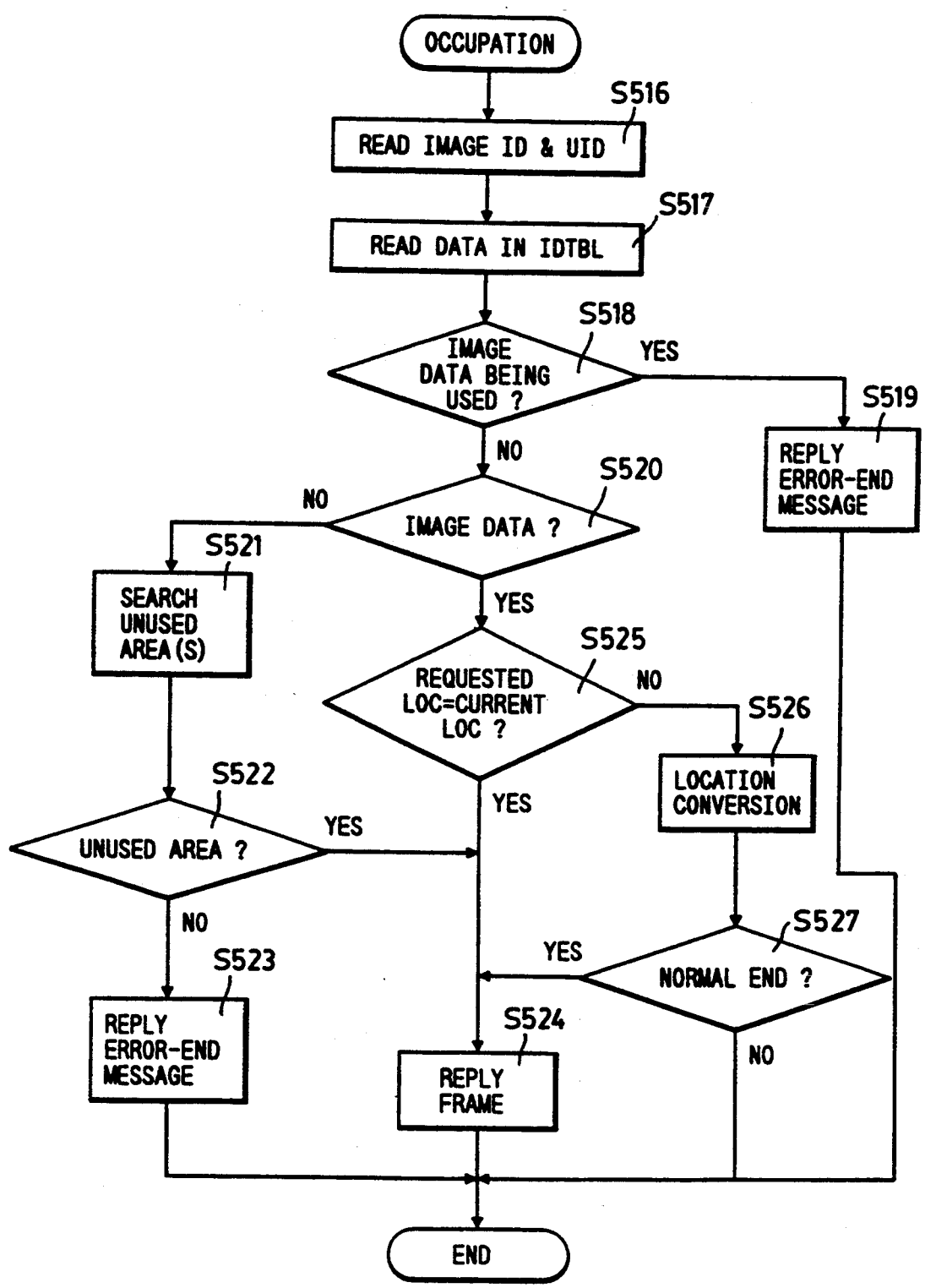

FIG. 8A is a flow chart showing the internal operation flow of the management process 202, and FIGS. 8B, 8C, 8D and 8E are flow charts showing internal operation flows of registration, occupation, release, and deletion of the management process 202. FIG. 9A is a format of an image data management table IDTBL 901 used by the management process 202, and FIG. 9B is a format of a memory area management table IMTBL 902. In the image data management table IDTBL, each line corresponds to one image datum. An image id of each datum, a horizontal data size "x-size", a vertical data size "y-size", a data width nbyte per pixel, a condition value representing the use condition of the image data, a related frame as a storage area related to the image data, and a user identifier uid of the image data registered by the user are stored in the image data management table IDTBL. In the memory area management table IMTBL, each line corresponds to one frame of information in the image memory. The memory area management table IMTBL includes lines of frames except for temporary frames (to be described later). Data "0" is stored in each line when the frame is not used. However, when the frame is used, the user identifier uid of the user who occupies the image area is stored as information for each image data.

The operation of the management process 202 will be described with reference to FIGS. 8A to 9B. The management process 202 reads out a request message transferred through interprocess communication (S501) and selects a request processor in accordance with the type of request affixed to the message (S502–S505, S502a–S505a). Control is shifted from the management process 202 to the selected request processor. When execution of the selected request processor is completed, the flow returns to read access of the request message (S501), or if not request is identified (S508). The above operations are repeated until a termination request (S506) is received and acted on (S507) (FIG. 8A).

If the type of request represents "registration" (FIG. 8B), the remaining data of the message are received as the x-size data, y-size data, nbyte data, and the uid data of the user who sends the message (S509). The management process 202 increments an internal variable stored as the latest image id by one (if the incremented value exceeds a preset maximum value, it is set to be 1) and defines the incremented value as the image id of the requested image data (S510). This image id is stored as the latest image id in the internal variable data. Subsequently, the image id values of the respective lines in the image data management table IDTBL are sequentially read out from the beginning (S511). If line numbers of 0 (i.e., nonregistered lines) are not present (S512), the management process 202 sends an error-end message to the execution process 201 (S513). Otherwise, the image id data, the x-size data, the y-size data, the nbyte data, and the uid data are registered in the nonregistered lines (S514). The management process 202 sends the image id to the execution process 201 (S515), and the registration is ended.

If the type of request is "occupation—continuous location" or "occupation—fixed location" (FIG. 8C), the remaining data of the message are received as the image id of the image data and the user identifier uid of the user who sends the message (S516). The management process 202 reads the image id values of the respective lines of the image data management table IDTBL (S517). If no line has an image id which coincides with the requested image id (i.e., if image data is not registered), or the condition value of a line whose image id coincides with the requested image id is 1 or 2 (image data is being used) (S518), the management process 202 sends an error-end message to the execution process 201 (S519), and the occupation is ended. Otherwise, the x-size data, the y-size data, the nbyte data, the condition value, and the related frame are read, and the subsequent operations are performed.

If the condition value is 0 (i.e., no image data) (S520), the values of the respective lines of the memory area management table IMTBL are read, and an unused area (i.e., the value of the memory area management table IMTBL is zero) having a size corresponding to the image is searched out (S521). If an appropriate unused area is not available (S72), the management process 202 sends an error-end message to the execution process 201 (S523), and the occupation is ended. Otherwise, the values of these lines of the memory area management table IMTBL are updated to user identifiers uid. The frame numbers of these unused areas are registered in the related frames and the updated value array of the image data management table IDTBL. The content of the updated value array is sent to the user represented by the uid (S524), thereby ending the occupation.

When the condition value of the image data management table IDTBL is not zero (i.e., image data is already present) and if the location method at the current moment represented by the condition value coincides with the requested location method (S525), the updated value array stored in the corresponding frame in the image data management table IDTBL is sent to the execution process 201 (S524). The occupation is then ended. If no coincidence is established, location conversion is performed (S526). If the operation is normally ended (S527), the updated value array stored in the corresponding frame of the image data management table IDTBL is sent to the execution process 201. However, when an error-end state is detected, the occupation is ended.

The updated value array has a size corresponding to the number of frames of the image memory and has the following content:
{1,3,0,0,0,0,0,0,0,0,0,0,0,0,0,0}

"0" represents no designation, and a negative value represents an error. If the type of request represents "release" (FIG. 8D), the remaining portion of the message is received as the image id of the image data and the user identifier uid of the user who sends the message (S528). The items in the image data management table IDTBL and the memory area management table IMTBL are referred to (S529). If the received user identifier uid coincides with the occupant's image memory area corresponding to the image id or the preset privileged user uid (S530), the condition value of the line corresponding to the image id in the image data management table IDTBL is updated to a value representing a non-occupation state (S531). The management process 202 replies the normal-end message to the execution process 201 (S532), thereby completing release processing. Otherwise, the management process 202 replies an error-end message to the execution process 201 (S533), and release processing is completed.

If the type of request represents "deletion" (FIG. 8E), the remaining portion of the message is received as an image id of the image data and a user identifier uid of the user who sends the message (S534). The management process 202 refers to each item in the image data management table IDTBL (S535). If the received user identifier uid coincides with the user identifier uid of the user who creates the image data corresponding to the image id or the privileged user's identifier uid (S536), and if the condition value represents a non-occupation state of the image data, the image id of the image data management table IDTBL is set to be "0", and the condition value is set to be "0" (S537). The frame value in the memory area management table IMTBL is set to be "0" (S538). The management process 202 replies a normal-end message to the execution process 201 (S539), and deletion is completed. Otherwise, the management process 202 replies with an error-end message to the execution process 201 (S540), and deletion is completed.

Figure 10:
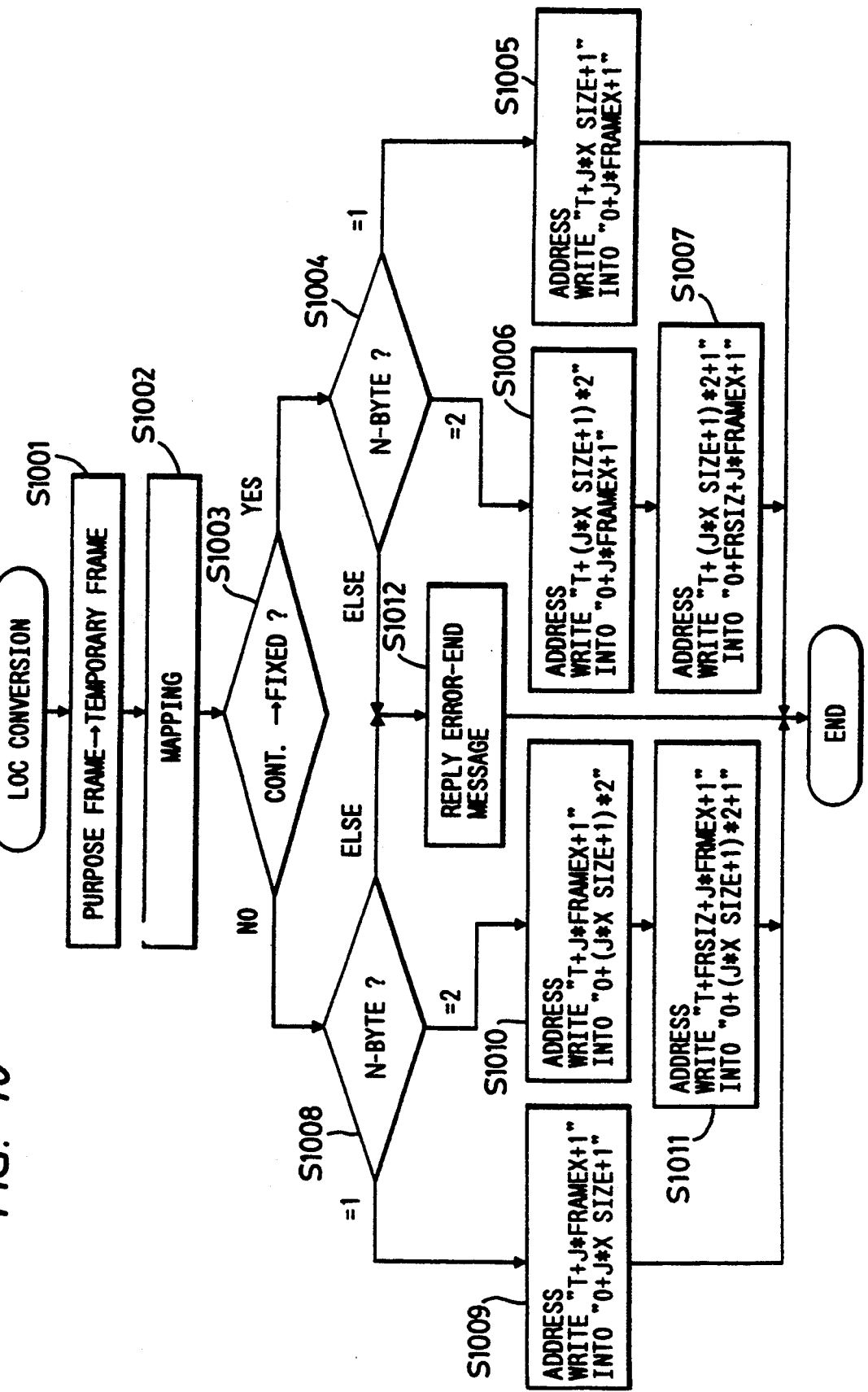
FIG. 10 is a flow chart showing an operation of location conversion.

FIG. 10 is a flow chart showing an operation of the management process when it performs location conversion.

The management process sends a command to the image process to transfer the content of the purpose frame to a temporary frame which is prepared independently of a frame to which the content of the frame is allocated (S1001). The temporary frame and the purpose fame are mapped to the virtual memory area of the management process 202 (S1002), thereby obtaining virtual memory addresses T and O, respectively.

Subsequently, if conversion is performed from continuous location to fixed location (S1003) and the value of the data width in the image data management table is 1 (byte) (S1004), one byte of "address T+J*x-size+I" is written into "address O+J*framex+I" (S1005).

However, if conversion is performed from the continuous location to fixed location and the value of the data width in the image data management table is 2 (bytes), one byte of "address T+(J*x-size+I)*2" is written into "address O+J*framex+I" (S1006), and one byte of "address T+(J*x-size+I)*2+1" is written into "address O+FRSIZ+J*framex+I" (S1007).

If conversion is performed from the fixed location to continuous location and the value of the data width in the image data management table is 1 (byte) (S1008), one byte of "address T+J*framex+I" is written into "address O+J*x-size+I" (S1009).

If conversion is performed from the fixed location to continuous location and the value of the data width in the image data management table is 2 (bytes), one byte of "address T+J*framex+I" is written into "address O+(J*x-size+I)*2, and one byte of "address T+FRSIZ+J*framex+I" is written into "address O+(J*x-size+I)*2+1" (S1011).

where x-size is the image data size in the horizontal direction, framex is the number of frame pixels in the horizontal direction determined by hardware, framey is the number of frame pixels in the vertical direction determined by hardware, and FRSIZ is framex*framey. I indicates that a loop is formed from 0 to (x-size−1) and J indicates that a loop is formed from 0 to (y-size−1) (image data size in the vertical direction), thereby performing location conversion throughout the entire area of the image.

When the data width represents any value except for the above values, an error-end message is replied with, and the location conversion is completed (S1012).

Modifications of Second Embodiment

In the second embodiment, information representing an area in the image memory is given by a frame number. However, if addressing of the image processor is performed by real addresses of the image memory, the real addresses can be used as area designation information, thereby omitting an operation for calculating a real address from the frame number. In the second embodiment, one image is stored in one frame. However, when image processing hardware capable of utilizing divided image frames is used, information representing which partial areas are occupied may be stored in the management table, thereby storing a larger number of images in the image memory.

When the image memory area is full, image data in the "release" state is transferred to the virtual memory area of the management process and is saved in the main memory or a system disk. The image memory area (frame) of the saved image data can be assigned to another image. In addition, in the second embodiment, the CPU in the EWS performs location conversion by software of the management process. However, location conversion performed by image processing hardware may be controlled by the management process.

As described above, the management process is arranged independently of the execution process for actually performing image processing, and image data is subjected to location conversion. Therefore, an appropriate area can be dynamically assigned as an area to be used in accordance with the use condition of the image memory. The program can be utilized without destructing the processing results of other programs. In addition, processing by existing image processing software and processing by the image processor can be easily executed in a mixed manner. Information such as an image memory frame size is processed by the management process and a mapping routine. Even if the size of frame of the image memory is changed, only the management process and the mapping routine are changed. All image processing programs in the system which employs the present invention can effectively utilize new image frames.

Third Embodiment

Figure 11:
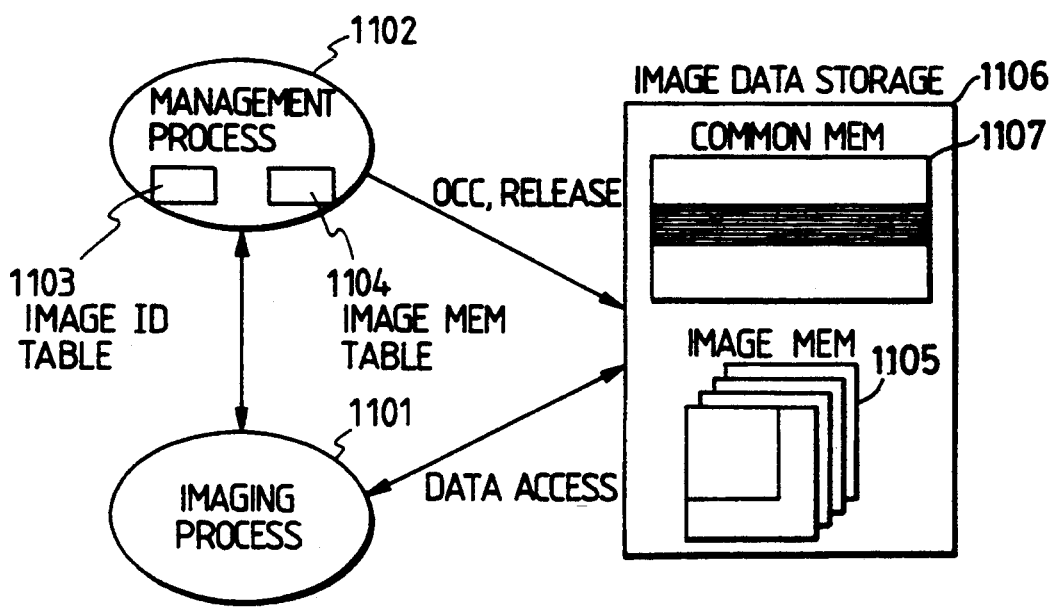
FIG. 11 is a view showing an image processing system according to still another embodiment of the present invention.

FIG. 11 is a block diagram showing an image processing system according to a third embodiment of the present invention. This arrangement includes an imaging process 1101 for actually performing image processing and a management process 1102 for managing an image recording area. The management process 1102 is initialized together with the image processing system and offers service to a large number of image processes.

The overall operation of the image processing system will be generally described. The imaging process 1101 makes an occupation or release request and sends it to the management process 1102 through interprocess communication when the image recording area becomes necessary or unnecessary. The management process 1102 refers to an internal image ID table 1103 (to be described later) and an image memory table 1104 (to be described later) and performs occupation or release (or in addition transfer) of the image data with respect to the image memory 1105 in the image data storage 1106 of the image processing hardware or apparatus (which also has common memory 1107) in accordance with the type of accepted request. The tables 1103 and 1104 are updated to a new state of image memory areas. In addition, the management process 1102 sends occupation information, release information, or the like to the imaging process 1101 through interprocess communication. Image data is processed on the basis of the received information.

Figure 12A:
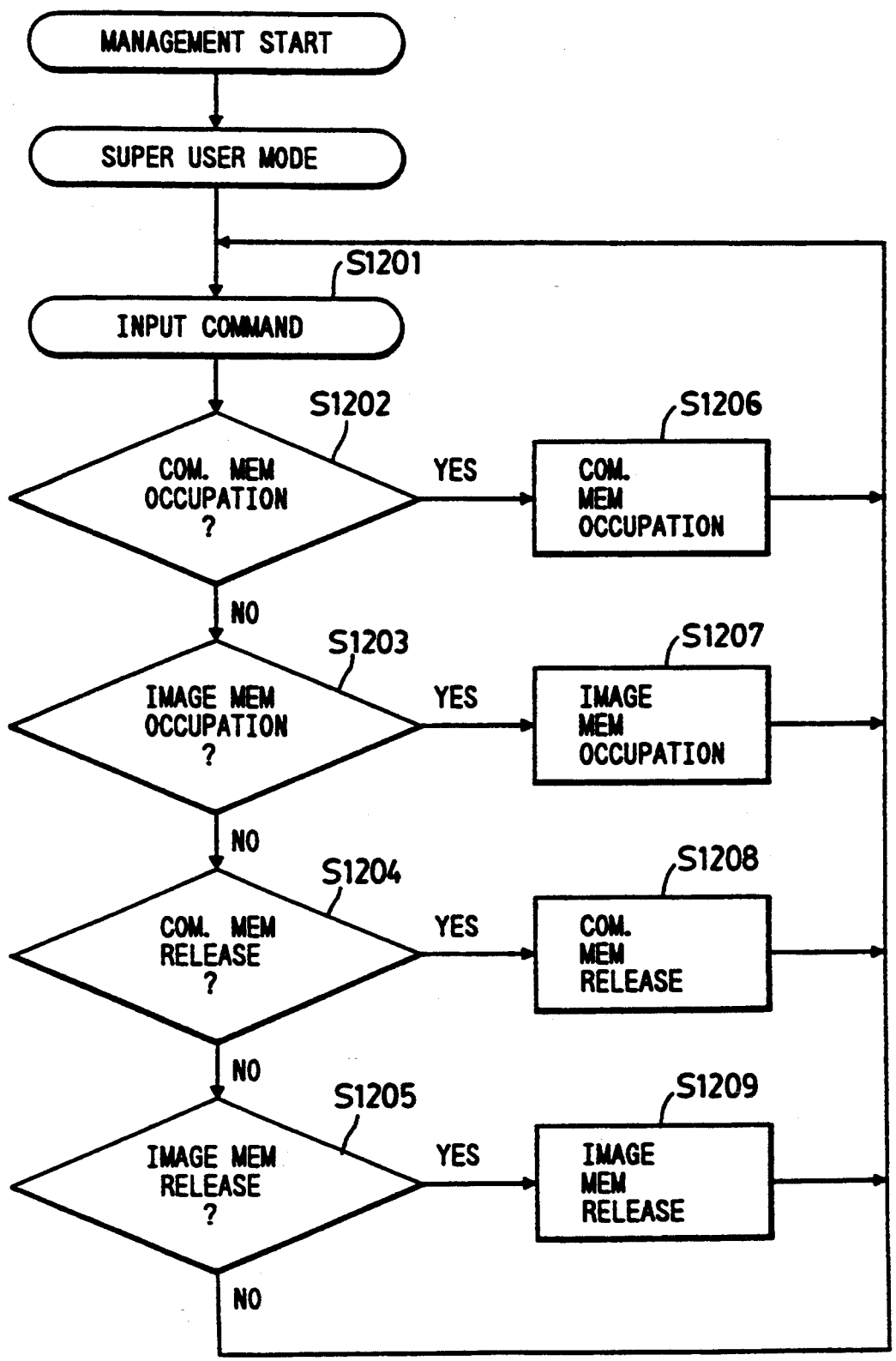
Figure 12B:
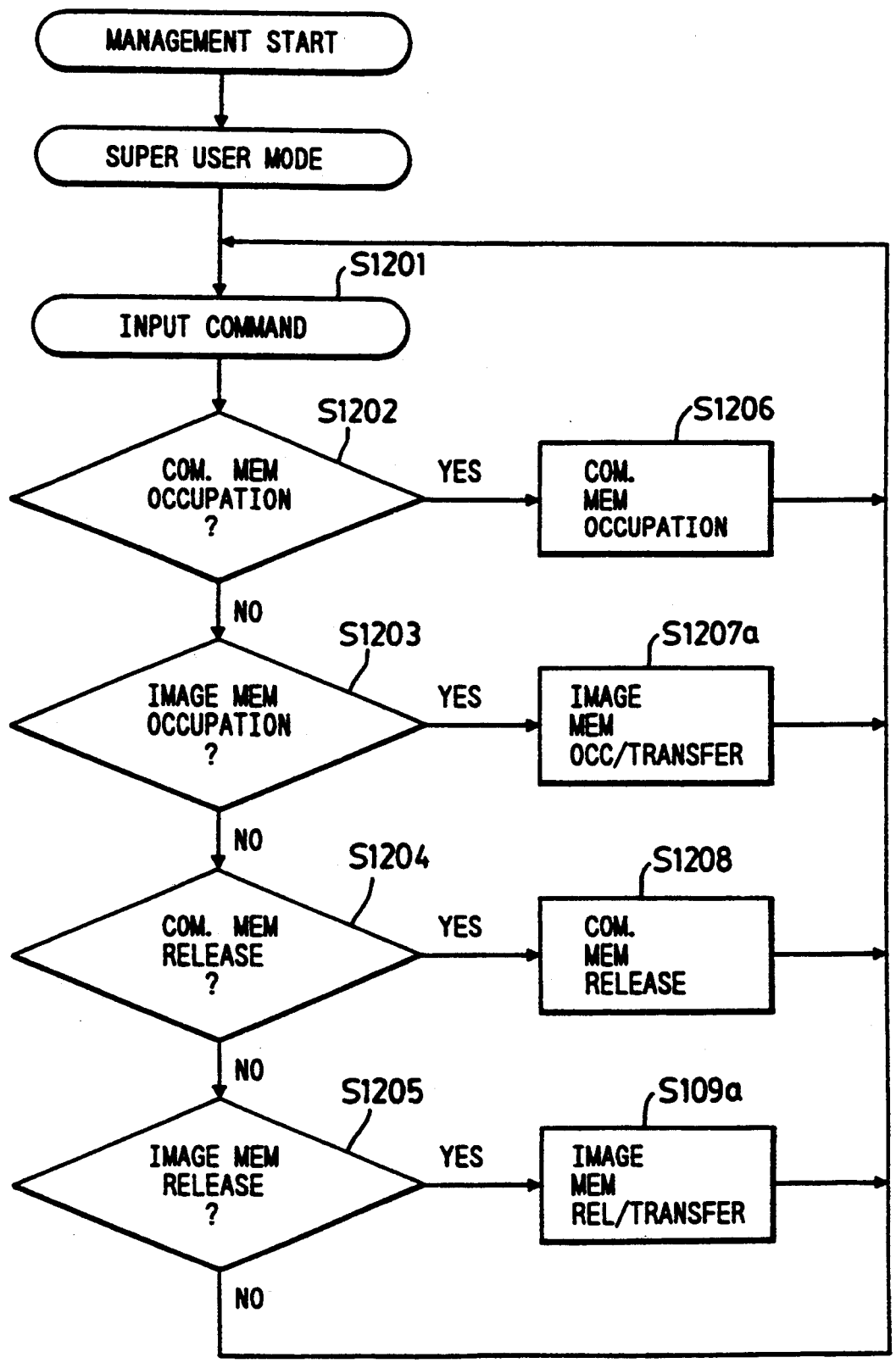

FIGS. 12-1 and 12-2 are flow charts showing an internal operation flow of the management process 1102. FIG. 13 shows a format of the image ID table 1103 used by the management process 1102. All image data controlled by the management system of the present invention are registered in this table. Each line in FIG. 13 corresponds to a respective image (designated by an image id). A natural number which allows the system to uniquely identify it is used as an image identifier. When the image data is not used, "0" is set as the image identifier. FIG. 14 shows the image memory table 1104 for managing the image memory in the image processing hardware shown in FIG. 11. Each line in FIG. 14 corresponds to one frame information. If the image memory is not used, "0" is set. Otherwise, an identifier (id) of a user who occupies the corresponding image data is stored. The operation of the management process will be described with reference to FIGS. 12 to 14. The management process 1102 is initialized as a super user process. The management process 1102 translates a command (request) (the command has a protocol shown in FIG. 15) (S1201) sent by the interprocess communication function and controls each request processor in accordance with the type of request (S1201-S1209). When execution of each request processor is completed, the management process restores a standby state for waiting for the next request. These operations are repeated. An operation of each request processor will be described below.

1. Occupation in Common Memory (S1202, S1206)

An image size, and the number of bytes per pixel are read out from parameters of the request (command) in FIG. 15 to calculate a size of a necessary memory area. A new image identifier and the above data and status are registered in the image memory table 1104, and a slave process is generated to establish a coincidence between its execution user id and a user id representing the user who makes a request, thereby assuring a memory area in the common memory. Thereafter, the slave process is disabled. When execution of the slave process is completed, the master process replies information of the assured memory area and the image identifier to the imaging process 1101.

2. Release in Common Memory (S1204, S1208)

An image identifier is read out from the parameters of the request to release the corresponding image memory area of the common memory, and the corresponding table is initialized to zero. The release information is replied to the imaging process 1101.

3. Occupation in Image Memory (S1203, S1207)

An image identifier is read out from the parameters of the request, and a necessary image memory area is obtained by referring to the image memory table 1104 (thereafter, the image data in the common memory is transferred to this area). The image memory table 1104 is updated to a new state of the image memories, and the information of assured memory area is replied sent in reply to the imaging process 1101.

4. Release in Image Memory (S1205, S1209)

Information associated with the image memory is read out from the parameters of the request (thereafter, the corresponding image data is transferred to the common memory), and the corresponding image memory is released. The image memory table 1104 is updated to a new state of the image memories. Information of the released memory area is replied to the imaging process 1101.

FIG. 12-2 shows a variation of FIG. 12-1, differing in the use of transfer with respect to the image memory (S1207a, S1209a).

The above operations can be achieved by the Sun 3/260C+NEXUS 6810 system by using a socket system call for interprocess communication and a shared memory system call for a common memory operation, and mmap, valloc, and free system calls for image memory operations.

In the third embodiment, information representing an area in the image memory is given by a frame number. However, if addressing of the image processor is performed by real addresses of the image memory, the real addresses can be used as area designation information, thereby omitting an operation for calculating a real address from the frame number. In the third embodiment, one image is stored in one frame. However, when image processing hardware capable of utilizing divided image frames is used, information representing which partial areas are occupied may be stored in the management table, thereby storing a larger number of images in the image memory.

The management process for the image memory area which is independent from the imaging process for actually performing image processing has a function for transferring image data between the common memory and the image memory. Therefore, the programmer can describe an image processing program without considering a physical location of the image data and image transfer.

The management process for the image memory area which is independent from the imaging process for actually performing image processing is arranged to arbitrarily allocate an appropriate dynamic memory area to the common memory in the computer or the image memory in the image processing hardware or apparatus upon execution of image processing. Therefore, the following effects can be obtained:

A. The program can be described without considering destruction of image memory areas of other programs.

B. Image data of processing results of other processes can be input through the common memory.

C. The image processing program need not be modified upon a change in image processing hardware arrangement.

What is claimed is:

1. A method of managing an image memory by a process independent of an image processing process, said method comprising the steps of:

accepting a first request for occupying an area with an user identifier from an image processing process;

ascertaining an unoccupied area in the image memory in response to the request accepted in said first accepting step by referring to memory management information including occupation status information and a user identifier for respective areas of the image memory in a management memory;

updating the memory management information according to the ascertained area, such that the occupation status information of the ascertained area indicates occupied and the user identifier corresponds to the accepted user identifier;

thereafter accepting a second request, originating from an image processing process, for releasing an area with information specifying the area and a user identifier;

determining, in response to the request accepted in said second accepting step, whether the specified area is permitted to be released based on the user identifier accepted in said second accepting step by referring to the memory management information; and updating the occupation status information for the specified area to indicate unoccupied when the area is determined to be permitted to be released in said determining step.

2. A method according to claim 1, further comprising the step of transmitting to the image processing process information indicating whether the specified area is released.

3. A method according to claim 1, wherein said determining step determines that the specified area is permitted to be released when the accepted user identifier represents a super user or corresponds to a user identifier for the specified area stored in the management memory.

4. A method of managing an image memory by a process independent of an image processing process, said method comprising the steps of:

accepting a first request for registering an image with an user identifier from an image processing process;

ascertaining an unoccupied area in the image memory in response to the request accepted in said first accepting step by referring to memory management information including occupation status information for respective areas of the image memory in a management memory;

storing an image management information including an user identifier and an image identifier in a register memory;

updating the memory management information according to the ascertained area, such that the occupation status information of the ascertained area indicates occupied and the user identifier corresponding to the accepted user identifier;

thereafter accepting a second request, originating from the image processing process, for deleting an image with the image identifier and the user identifier;

determining, in response to the request accepted in said second accepting step, whether the image data according to the accepted image identifier is permitted to be deleted based on the accepted image identifier and user identifier by referring to the information stored in the register and management memories; and updating the occupation status information for the area determined to be permitted to be deleted, to indicate unoccupied.

5. A method according to claim 4, further comprising the step of transmitting information indicating whether the area is released or not to the image processing process.

6. A method according to claim 4, wherein said determining step determines that the area is permitted to be released when the accepted user identifier represents a super user or corresponds to a user identifier for the area stored in the register memory.

7. A method of managing an image memory by a process independent of an image processing process, said method comprising the steps of:

accepting a first request for registering an image with a location format from an image processing process;

ascertaining an unoccupied area in the image memory in response to the request accepted in said first accepting step by referring to memory management information including occupation status information for respective areas of the image memory in a management memory;

storing an image management information including an image identifier and the accepted location format in a register memory;

updating the memory management information according to the ascertained area, such that the occupation status information of the ascertained area indicates occupied;

thereafter accepting a second request, originating from the image processing process, for occupation by an image with the image identifier and the location format;

determining, in response to the request accepted in said second accepting step, whether the location format of the image data according to the accepted image identifier corresponds to the location format accepted in said second accepting step by referring to the information stored in the register and management memories;

converting the location format of the image data according to the accepted image identifier to the accepted location format if the location format of the image data is determined to be different from the accepted location format;

updating the occupation status information for the area of the image data according to the accepted image identifier, to indicate occupied; and updating the image management information in the register memory, such that the location format of the image data according to the accepted image identifier corresponds to the converted location format.

* * * * *

UNITED STATES PATENT AND TRADEMARK OFFICE
CERTIFICATE OF CORRECTION

PATENT NO. : 5,384,900                                   Page 1 of 3
DATED      : January 24, 1995
INVENTOR(S): Hiroaki Sato, et al It is certified that error appears in the above-indentified patent and that said Letters Patent is hereby corrected as shown below:

On the title page, item
[30] Foreign Application Priority Data

"Mar. 14, 1988 [JP] Japan ........63-058659" should read
--Mar. 14, 1988 [JP] Japan ........63-059659--.

[57 Abstract]

Line 2, "information, should read --information and--.

COLUMN 2

Line 4, "frames" should read --frame--.

COLUMN 4

Line 4, "for" should be deleted;
Line 21, "a" should be deleted; and
Line 27, "an" should be deleted.

COLUMN 6

Line 31, "bus.  When" should read --bus. When--.

COLUMN 7

Line 18, "request represents "occupation"," should read --request is determined as representing "occupation" (401a),--; and
Line 58, "replied" should read --sent in reply--.

UNITED STATES PATENT AND TRADEMARK OFFICE
CERTIFICATE OF CORRECTION

PATENT NO. : 5,384,900
DATED : January 24, 1995
INVENTOR(S) : Hiroaki Sato, et al It is certified that error appears in the above-indentified patent and that said Letters Patent is hereby corrected as shown below:

COLUMN 9

Line 28, "request (S403a)" should read --request (S403a) and--.

COLUMN 11

Line 32, "not" should read --no--.

COLUMN 12

Line 12, "(S72)," should read --(S572),--; and
    Line 42, "error. If" should read --error. If--.

COLUMN 13

Line 20, "fame" should read --frame--;
    Line 45, "O +(J*x-size+I)*2," should read --O+(J*x-size+I)*2"(S1010),--; and
    Line 47, "(S1011)." should read --(S1011),--.

UNITED STATES PATENT AND TRADEMARK OFFICE
CERTIFICATE OF CORRECTION

PATENT NO. : 5,384,900
DATED : January 24, 1995
INVENTOR(S) : Hiroaki Sato, et al It is certified that error appears in the above-indentified patent and that said Letters Patent is hereby corrected as shown below:

COLUMN 15

Line 55, "replied" should be deleted.

Signed and Sealed this

Sixth Day of June, 1995

*Attest:*

*Attesting Officer*

BRUCE LEHMAN

*Commissioner of Patents and Trademarks*